United States Patent Office 3,513,721
Patented May 26, 1970

3,513,721
SMALL REFRIGERATION COMPRESSOR WITH COMPENSATED CAMSHAFT
Knud V. Valbjørn, Nordborg, and Bendt Wegge Rømer, Augustenborg, Denmark, assignors to Danfoss A/S, Nordborg, Denmark, a company of Denmark
Filed July 5, 1968, Ser. No. 742,568
Claims priority, application Germany, July 8, 1967, D 53,552
Int. Cl. F16c 3/20
U.S. Cl. 74—603   1 Claim

ABSTRACT OF THE DISCLOSURE

A refrigeration compressor provided with a driven crankshaft in which a crank-journal thereon is provided with a plurality of parallel bores offset from the longitudinal axis of the crankshaft which in conjunction with a plurality of parallel bores disposed in a projection of the crankshaft on to the crank-journal and disposed offset from the longitudinal axis in a direction toward the crank-journal reduce the size of the mass necessary to compensate for the imbalance of the crankshaft caused by the crank.

The present invention relates generally to small refrigeration compressors and more particularly to an improved motor crank-shaft construction.

Compressors, for example refrigeration compressors, have the motor shaft eccentrically loaded because of a crank on the crankshaft for reciprocably driving a piston in the compressor. In order to avoid imbalance it is the usual practice to use a compensating weight on the crankshaft. The eccentricity of the weight is opposite to that of the crank and compensates for it. The provision of a compensating weight of sufficient size, however, frequently causes some difficulty in view of the necessity of the space required for applying the compensating weight.

Moreover, it is known to provide an oil-supply bore within the crankshaft and parallel with the axis of the shaft of the motor rotor within a projection of the crankshaft parallel to the crank journal. Such a bore is able to provide lubrication to various points and to carry excess oil away from the lubricated points. Moreover, the use of two parallel bores in order to supply oil separately to the shaft bearing and the crank bearing is likewise known. These oil bores also have the effect of reducing the imbalance of the crankshaft due to the crank. However, since the bores are displaced only a short distance from the longitudinal axis of the crankshaft their compensating effect is slight.

It is a principal object of the present invention to provide a crankshaft construction in which imbalance compensation is facilitated.

In accordance with the invention a refrigeration compressor crankshaft is provided with at least one bore through a crank-journal spaced laterally from the longitudinal axis of the crankshaft. Preferably a plurality of parallel bores are provided and these reduce the mass of the crank-journal eccentric to the longitudinal axis so that there is a reduction in the imbalance to which the crankshaft is subjected so that a smaller compensating weight may be used for compensating for the imbalance. The crankshaft does not have any of its strength reduced since bending forces do not occur at the crank-journal. The compressive forces transmitted to the reciprocably driven piston are adequately dealt with by the remaining cell-like structure remaining after the bores have been formed in the crank-journal.

A further reduction in weight to be compensated is accomplished by the use of a plurality of parallel bores in the crankshaft portion projected on or extending through the crank-journal parallel to the crankshaft longitudinal axis. In accordance with the invention three bores are formed each as a continuation of an axial bore and extend through the motor crankshaft from the axial bore to an end face thereof. The bores provide separate lubricating paths for the shaft bearings and crank bearing.

Other features and advantages of the crankshaft in accordance with the present invention will be better understood as described in the following specification and appended claim, in conjunction with the following drawing, in which:

Figure 1:
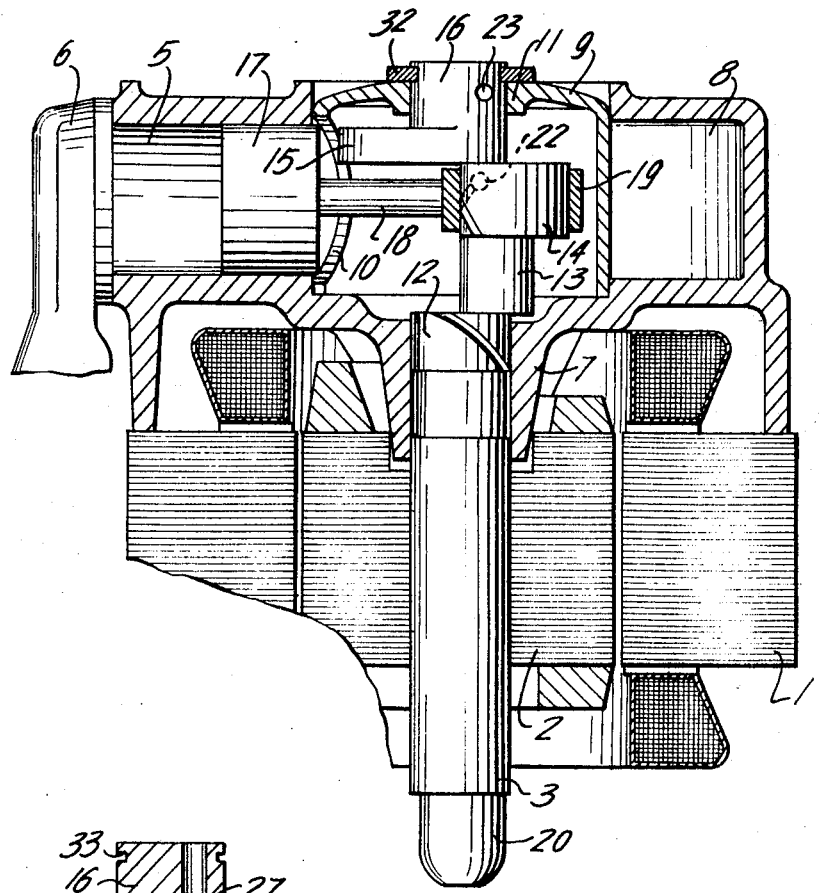
FIG. 1 is a longitudinal section view of a small refrigeration compressor provided with a crankshaft in accordance with the invention.

As illustrated in FIG. 1 a motor driven refrigeration compressor comprises a stator 1 and a rotor 2 for driving a motor crankshaft 3. A compressor housing and support element 4 is provided with a cylinder 5 and supports the motor and a compressor head 6. The housing has integral therewith a main bearing 7 through which the crankshaft 3 extends axially and has sound reduction chambers 8 provided therein. The housing has a cavity within which is received a cup-shaped insert 9 introduced from above into the cavity in which it is received and having a recess 10 adjoining the cylinder 5. The insert provides an upper bearing 11 and the crankshaft has a main journal portion 12 in the lower bearing 7 and an intermediate portion 13 and a crank-journal 14. A compensating weight 15 compensates for imbalance caused by the eccentric crank-journal of the crankshaft and an upper journal 16 extends through the upper bearing 11. A piston 17 is reciprocably driven through a connecting rod 18 having a crank bearing 19 mounted on the crank-journal 14 for reciprocable drive therefrom when the crankshaft 3 is rotatably driven by the rotor 2.

Figure 2:
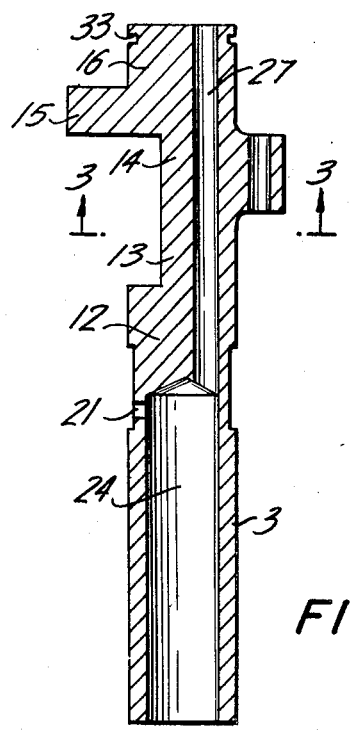
FIG. 2 is a longitudinal section view of another motor crankshaft constructed according to the invention.

The crankshaft 3 is illustrated in two embodiments in FIGS. 1 and 2 wherein the construction is almost completely similar and the same reference numerals are used to denote alike parts. The crankshaft is provided with an oil-supply device 20 in the form of a hollow conical element for delivering oil supplied through three passageways 21, 22 and 23 to the main bearing 7, the crank bearing 19, and the auxiliary bearing 11. The compressor is provided with the known helical grooves or oil distributors in the bearing portions for distributing oil throughout the bearing surfaces.

Oil is supplied from the oil supply device 20 through an axial bore 24 which extends axially to the vicinity of the main bearing 7. The crankshaft has three bores 26, 27, 28 in communication with the axial bore 24 and extending axially in the crankshaft as continuations thereof. The three bores provide independent oil supply to the bearings as later described. The axis of the three oil bores 26, 27 and 28 are parallel but are offset from the central longitudinal axis 25 of the shaft 3 in a direction toward the crank-journal 14. These three bores extend through the projection of the shaft 3 onto the crank journal 14 and all three bores open to the upper end face of the shaft 3. The bore 26 supplies the crank bearing with oil through the transverse passageway 22 and another bore 28 supplies the auxiliary bearing with oil through the transverse passageway 23. The bore 27 serves exclusively for conveying excess oil. This insures that all three bearings are provided with oil immediately upon starting of the motor compressor so that none of the three bearings can become damaged from loss of oil supply. A little excess oil is available right from the outset at the start of the compressor. It will be noted that the provision of the three parallel bores spaced from the central axis, and disposed in a direction toward the eccentric crank, reduces the weight of the shaft on the crank-journal side so that the weight compensation therefor is reduced.

Figure 3:
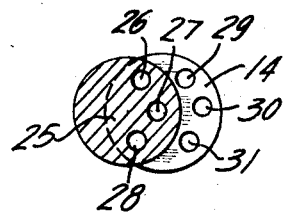
FIG. 3 is a section view taken along section line A—A of FIG. 2.

In addition three bores 29, 30 and 31, the axes of which are parallel, are provided in the crank-journal 14 as illustrated in FIGS. 2 and 3. These bores further reduce the mass of the crank or crank-journal and, therefore, reduce imbalance of the crankshaft so that the compensating weight 15 can be correspondingly reduced.

The embodiment of the compressor to which the invention is applied is a compressor having a vertical motor crankshaft having an axial support ring or collar 32 at its upper end which can be welded on after assembly of the system. The shaft can also be made as illustrated in FIG. 2 and secured axially by means of a clip, not shown, for which an appropriate annular groove 33 is provided at the upper end of the shaft. Those skilled in the art will also understand that the advantages of the present invention can be applied to compressors having horizontal crankshafts.

While preferred embodiments of the invention have been shown and described it will be understood that many modifications and changes can be made within the true spirit and scope of the invention.

We claim:
1. In a machine, a driven crankshaft having an eccentric crank defining a crank-journal, said crankshaft having at least one bore in said crank-journal disposed eccentric to a longitudinal axis of an axial projection of said crankshaft on to said crank-journal, said crankshaft having an axial bore along a length of said crankshaft and having three other bores in communication with said axial bore and defining three continuations of said axial bore extending through a remainder of said crankshaft comprising said axial projection of said crankshaft, said three bores being offset from said longitudinal axis in the direction of said crank-journal, and said crank-journal comprising at least one other bore eccentric to said longitudinal axis of said axial projection of said crankshaft.

References Cited

UNITED STATES PATENTS 1,696,674    12/1928    Fourness _____ 74—570 XR
2,524,207    10/1950    Palmer _____ 74—603

FRED C. MATTERN, Jr., Primary Examiner
F. D. SHOEMAKER, Assistant Examiner